United States Patent [19]

Hettinger, Jr. et al.

[11] Patent Number: 4,612,298

[45] Date of Patent: Sep. 16, 1986

[54] CARBO-METALLIC OIL CONVERSION CATALYSTS

[75] Inventors: William P. Hettinger, Jr.; Hubert W. Beck, both of Russell, Ky.

[73] Assignee: Ashland Oil, Inc., Ashland, Ky.

[21] Appl. No.: 516,484

[22] Filed: Jul. 22, 1983

Related U.S. Application Data

[63] Continuation of Ser. No. 328,353, Dec. 7, 1981, abandoned.

[51] Int. Cl.$^4$ ............................................. B01J 29/06
[52] U.S. Cl. ........................................ 502/65; 502/64; 502/67; 502/68; 502/69
[58] Field of Search ................... 502/65, 68, 69, 64, 502/67

[56] References Cited

U.S. PATENT DOCUMENTS

| | | | |
|---|---|---|---|
| 3,140,249 | 7/1964 | Plank et al. | 208/120 |
| 3,140,322 | 7/1964 | Frilette et al. | 260/667 |
| 3,334,964 | 8/1967 | Reid | 23/113 |
| 3,367,886 | 2/1968 | Haden et al. | 252/455 |
| 3,402,996 | 9/1968 | Maher et al. | 23/112 |
| 3,433,589 | 3/1969 | Ciric et al. | 23/113 |
| 3,542,670 | 11/1970 | Erickson et al. | 208/120 |
| 3,671,191 | 6/1972 | Maher et al. | 23/113 |
| 3,867,308 | 2/1975 | Elliott, Jr. | 502/65 |
| 3,930,987 | 1/1976 | Grand | 208/111 |
| 3,939,058 | 2/1976 | Plank et al. | 208/120 |
| 3,972,832 | 8/1976 | Butter et al. | 252/437 |
| 3,972,835 | 8/1976 | Hoffman et al. | 502/65 |
| 3,985,640 | 10/1976 | Lussier et al. | 208/120 |
| 3,994,800 | 11/1976 | Lussier et al. | 502/67 |
| 4,085,156 | 4/1978 | Frilette et al. | 260/671 R |
| 4,100,108 | 7/1978 | Alafandi et al. | 252/455 Z |
| 4,111,846 | 9/1978 | Elliott, Jr. | 502/65 |
| 4,123,390 | 10/1978 | Sherman et al. | 502/79 X |
| 4,125,591 | 11/1978 | Lindsey | 423/328 |
| 4,158,621 | 6/1979 | Swift et al. | 208/114 |
| 4,179,358 | 12/1979 | Swift et al. | 208/114 |
| 4,182,693 | 1/1980 | Gladrow | 252/455 Z |
| 4,198,320 | 4/1980 | Chester et al. | 502/64 |
| 4,218,307 | 8/1980 | McDaniel | 208/120 |
| 4,243,514 | 1/1981 | Bartholic | 208/91 |
| 4,257,874 | 3/1981 | Bergna | 208/111 |
| 4,292,169 | 9/1981 | Gladrow | 208/120 |

FOREIGN PATENT DOCUMENTS

| | | |
|---|---|---|
| 640858 | 4/1964 | Belgium . |
| 32298 | 12/1980 | European Pat. Off. . |
| 1514417 | 6/1978 | United Kingdom . |
| 1536590 | 12/1978 | United Kingdom . |
| 1584900 | 2/1981 | United Kingdom . |
| 1587236 | 4/1981 | United Kingdom . |

OTHER PUBLICATIONS

Machinskaya, M. E., "Effect of the Cation's Composition of an Aluminosilicate Base", Kinet. Katal. 1978, 19(3) 808–11.

Limova, T. V., "Superhigh-Silica Zeolite", Kinet. Katal. 19(6), 1607 (1978).

Yeh, J-J, "Cracking of Dewaxed Neutral Distillate Over Lanthanum Exchanged X and Y Zeolites", Can. J. Chem. Eng. 1979, 57(3), 292.

Vaughan, D. E. W., "Molecular Sieves Based on Pillared Interlayered Clays (PILC)", 5th Inter. Conf. Zeolites, Naples, Italy, Jun. 2 (1980).

Primary Examiner—Carl F. Dees
Attorney, Agent, or Firm—Richard C. Willson, Jr.; James L. Wilson

[57] ABSTRACT

Commercial catalysts are prepared combining the various ingredients into a catalytic binder system which has been freed of sodium so that the catalyst ingredients can be preferably spray dried and used in Fluid Catalytic Cracking or Reduced Crude Conversion hydrocarbon conversion operations without subsequent washing or drying. Catalysts can even be prepared on site, e.g., in spray drier operations performed in the FCC/RCC regenerator. Low-sodium slurries of any or all of the following ingredients can be employed in the manufacture: zeolites, clays, sols, carbon blacks, sacrificial sieves, acid matrix substances, and getters.

44 Claims, 1 Drawing Figure

CARBO-METALLIC OIL CONVERSION CATALYSTS

This application is a continuation of application Ser. No. 06/328,353, filed 12/07/81 now abandoned.

This invention is concerned with characterizing a select group of hydrocarbon conversion catalysts suitable for converting carbo-metallic oil containing hydrocarbons such as reduced crudes, residual oils, topped crudes and high boiling hydrocarbons such as vacuum gas oils boiling above about 650° F. and comprising residue material boiling in excess of 1025° F. to low boiling transportation fuels. The select group of catalysts of this invention and method of preparation possess a high concentration of at least one select high activity crystalline zeolite of high lanthanum exchange content for stability dispersed in a matrix of high pore volume of at least 0.35 cc/gm. and pore size to particularly implement liquid and gasiform material diffusion contact with the catalyst particle. A high pore volume and relatively large pore size matrix material complex is provided with and/or without acidic cracking activity but preferably prepared to provide at least some acidic cracking activity for catalytic cracking of some deposited liquid components of the high boiling feed. More particularly the matrix material of large pore size and high pore volume promotes the accumulation and passivation of metals deposited by the high boiling feed and particularly immobilization of deposited vanadia at temperatures encountered in a hydrocarbon conversion process such as the regeneration section thereof.

BACKGROUND OF THE INVENTION

The catalysts utilized in conventional gas oil fluid catalytic cracking (FCC) operations are tailored and prepared with less than 20 wt % zeolite for use other than in high carbon and metals depositions reduced crude cracking operations. The fact that these known catalysts may be used to crack residual oils and reduced crudes in a marginal short time operation does not mean they are economically suitable for processing liquid carbo-metallic oil contributing materials such as asphaltenes, polynuclear aromatics, polar molecules, naphthenes and porphyrins found in the residue of vacuum distillation and boiling above 1025° F. or more usually above 1050° F. Generally, a conventional gas oil FCC system employs a catalyst of relatively low crystalline zeolite content less than 20 wt % (10–15 wt %) which has a relatively low hydrothermal stability due to a low silica to alumina ratio zeolite; comprises a high cerium to lanthanum ratio exchanged crystalline zeolite dispersed in a matrix material of low pore volume usually not above about 0.22 cc/gm; and comprises a pore size opening of less than 500 angstroms. Generally, the matrix is merely a binder material of little or no acidic cracking activity.

The processing of gas oils (atmospheric and vacuum) and boiling below about 1025° F. with crystalline zeolites containing cracking catalysts has been available to the petroleum refiner since the early 60's and used considerably in the 70's. Generally such gas oil feeds are relatively low in metal contaminants and Conradson carbon value because of the feed purity sources selected. In addition, high sulfur or sour crudes and those comprising high levels of metal contaminants were not used in FCC operation in the absence of severe treating processes to remove or substantially reduce these undesired components. Such processes include hydrogenation, propane deasphalting, coking, hydrocracking, visbreaking and vacuum distillation. These processes are expensive and considerably reduce the volume of the crude oil upgraded to transportation fuels.

The catalysts developed for gas oil FCC processing have been developed to provide a high conversion and high selectivity to particularly gasoline boiling range products and light cycle oils since higher boiling product material is normally recycled to the cracking operation. In this gas oil processing environment, the deposition of metals is relatively low because of feed composition as well as the Conradson carbon level being generally below about 1 wt % and more usually such Conradson carbon deposition is within the range of 0.1–0.2 wt %. The feeds used in such gas oil operations are readily vaporized at the cracking reaction conditions and thus deposition of large amounts of liquids on the catalyst is minimized if not avoided. In FCC gas oil cracking operations, diffusion of the gas oil feed in the fluid particle size catalyst is not a major problem and pore blockage by excessive metal deposition by high boiling liquid hydrocarbons and by high coke deposition is not encountered as a major problem in the operating environment. Since deposition of undesired metal components and carbon is normally of a low order of magnitude there has been less need to provide a matrix material particularly designed or tailored to accumulate metal to the exclusion of substantially disturbing the catalyst cracking activity. Furthermore, and much more importantly, there has been no recognition by others of the need to particularly immobilize vanadia (vanadium pentoxide) because the level of depositon of vanadia encountered in gas oil cracking did not trigger recognition of particle sintering and coalescence due to liquefaction of this material at regeneration temperature conditions in the range of 1200° to 1600° F.

In contrast to the gas oil FCC operation as it is now known today, a reduced crude conversion operation processing much poorer quality feeds which have not been subjected to vacuum distillation, propane deasphalting and other contaminant removal processes as by hydrogenation, contain high levels of metal contaminants, sulfur and nitrogen compounds and a high Conradson carbon value. This high boiling dirty feed which we have chosen to define as carbo-metallic feed, composition characterization is particularly representative by much of the very poor qualtity feeds available to the refiner today.

The use of a conventional low zeolite content, less than 20 wt % zeolite containing FCC conversion catalyst as known today in a reduced crude conversion process leads to rapid catalyst deactivation by metals and high carbon deposits which can be corrected only by using very high catalyst replacement rates contributing to a highly unattractive economic operation. The rapid deactivation of the low zeolite containing catalyst is due to a rapid loss in zeolite activity and selectivity by metals deposition and relatively low hydrothermal stability for handling high levels of carbon deposition during regeneration thereof. Our studies have shown that high temperature regeneration in the presence of steam and especially vanadium and oxygen, rapidly destroys the activity of the zeolite cracking component of the catalyst and the zeolite cracking component of the catalyst and this condition is aggravated by using low silica-alumina ratio, higher sodium containing zeolites in conjunction with high metals deposition comprising vanadium, sodium and nickel, leading to rapid zeolite cracking activity neutralization. In addition the activity of the catalyst is affected by the large amount of heavy high boiling hydrocarbons in reduced crudes that are not vaporized and rapidly coat the catalyst particles with tacky liquid material also causing particle coalescence and agglomeration because of materials such as asphaltenes in the feed. Furthermore, the sorbed heavy hydrocarbons contribute to pore blockage, both in the matrix, and especially zeolite pores, and aggravate diffusion problems because of low pore volume, and effect acid site neutralization by adsorption of basic nitrogen compounds in the high boiling reduced crude feed.

The problems above reported with respect to cracking activity, acidity, hydrothermal stability, diffusion and pore blockage, sodium content of the zeolite, acid site neutralization, metals accumulation and vanadia immobilization are reduced or circumvented in substantial measure by employing the special catalyst compositions of the present invention for use in a Reduced Crude Conversion Process.

SUMMARY OF THE INVENTION

This invention is directed to the identification and characterization of an improved and novel class of catalyst compositions particularly suitable for converting high boiling hydrocarbons or heavy oil feeds recovered as atmospheric bottom of an atmospheric distillation tower and comprising asphaltenes, polynuclear aromatics, polars, naphthenes, porphyrins, nitrogen and sulfur compounds boiling above 1025° F. The present invention is concerned with the utilization of these unique catalysts, and identification of one or more unique methods for preparing a select group of these catalyst compositions. The catalyst compositions thereof are particularly adapted and suitable for the conversion of one or more high boiling feeds herein identified and known by one or more terms such as a combination of materials in heavy oils comprising components boiling above 1050° F., as reduced crudes, topped crudes, residual oils, shale oils, oil products from coal liquefaction, tar sands oil products and resids all of which comprise some carbo-metallic oil components in the form of metals, asphaltenes, refractory aromatic and polar compounds, naphthenes and porphyrins. The special catalysts of this invention are useful for processing Conradson carbon producing feed materials in the range of 2 to 8 Conradson carbon and comprising up to 75 ppm or more of vanadium. The catalyst compositions of this invention are particularly useful for processing high boiling feeds above identified when carrying an accumulated metals level of Ni+V in excess of 6000 ppm of which either nickel or vanadium is in a major proportion. In yet a further aspect, the present invention is concerned with providing an improved metals tolerant catalyst composition of high cracking activity whereby the catalyst particle service is extended and the catalyst inventory of the processing system is kept at a desired low level of magnitude contributing significantly to the economic efficiency of a reduced crude cracking operation. The provision for low catalyst inventories is desirable since it permits reducing the size of costly regeneration equipment, reduces the relative time the high vanadium containing catalyst is exposed to time and temperature in the regenerator relative to the time it is engaged in riser cracking. The longer the time that a high vanadium containing catalyst is at high temperature in the presence of steam and $O_2$ has been found to be very detrimental to catalyst life. Low catalyst inventories reduce catalyst makeup inventory for maintaining a predetermined and desired catalyst activity-selectivity characterization in a circulating catalyst system comprising hydrocarbon conversion to form desired products and regeneration of catalyst used in such an operation.

The high boiling reduced crude conversion operation contemplated by this invention relies upon a maintained catalyst inventory which will permit the use of catalyst to oil feed ratios in the range of 5–20 to 1 in a short contact time temperature restricted cracking zone such as attained in a riser cracking zone. Also of low or restricted inventory is an associated catalyst stripping zone and interconnecting catalyst transfer conduits in combination with a catalyst regeneration operation comprising at least two stages of catalyst regeneration in sequence to achieve the removal of deposited hydrocarbonaceous materials. Thus by providing a catalyst composition which will accept a greater metals accumulation at desired retained activity and selectivity thereby permitting a longer on stream operation with a higher activity-equilibrium metals level catalyst will greatly reduce catalyst replacement rate and thus improve the process operating efficiency.

The improved high activity metals tolerant catalysts of this invention are special microspherical particle compositions of fluidizable particulate size in the range of 20 to 200 microns size comprising a higher than normal percentage of high activity crystalline aluminosilicate of large pore size dimensions, ion exchanged to provide a lanthanum rich crystalline zeolite of low residual sodium, less than 0.25 wt % in the finished catalyst and preferably less than 0.1 wt % sodium oxide dispersed in a special matrix composition and comprising a clay which may provide some cracking activity with or without acidic modifiers dispersed in a silica or silica-alumina of gelaceous or colloidal ancestrary. The catalyst is prepared under conditions to provide a pore volume greater than 0.22 cc/g and preferably at least about 0.32 cc/g. A catalyst particle with a pore volume of at least 0.4 cc/g is particularly desirable. The zeolite-clay mixture is prepared in combination with a binder material initially comprising one or more refractory metal oxides providing desired hardness in the final microspherical particle. The refractory metal oxide or oxides suitable for this purpose may be selected from the group consisting of silica, alumina, silica-alumina, silica-magnesia, silica-alumina-magnesia, silica-titania, silica-zirconia, titania, zirconia and mixtures and combinations thereof. The special catalysts of this invention are based on forming a silica sol (colloidal) matrix material by one or more processing routes including starting with a sodium silicate to form gelaceous or colloidal suspension with additions thereto as herein provided.

Zeolites or crystalline aluminosilicates (CAS) of acceptable pore dimensions and particle size suitable for the preparation of cracking catalyst composition usable according to this invention are micron size three dimensional structures containing a large number of uniform openings or cavities interconnected by smaller, relatively uniform holes or channels.

Some zeolites which may be used with varying degrees of success include mordenite, gmelinite, zeolite "L", ZSM 4, faujasite and dealuminized faujasite of at least 5.5/1 silica to alumina ratio. A "Y" type crystalline faujasite is particularly preferred in preparing the catalyst of this invention. Some characteristics of these crystalline zeolite are as follows:

| Summary of Some Zeolite Pore Sizes | | | |
|---|---|---|---|
| | Pore Dimensions | Pore Free Area ($A^2$) | Si/Al Ratio |
| Faujasite | 7.4 × 7.4 | 55.0 | 2.8 |
| ZSM4 | 7.3 × 7.3 | 53.5 | 3.1 |
| "L" | 7.1 × 7.1 | 50.5 | 3.6 |
| Gmelinite | 7.0 × 7.0 | 49.0 | 2.5 |
| Mordenite | 6.7 × 7.0 | 46.8 | 6.0 |

The preferred zeolite for preparing the metals tolerant catalyst of this invention is a catalytically active faujasite crystalline zeolite providing a silica to alumina ratio greater than 5 and which has been ion exchanged several times before and after calcination to include rare earths and particularly provide a lanthanum to cerium ratio of at least 1/1 and preferably at least 2/1:La/Ce or more. It is known that zeolite stability is directly proportioned to the lanthanum or neodymium content and inversely proportional to the cerium content. Thus in commercial applications, some lanthanum rich exchange solutions have been used for zeolite exchange. The faujasite type zeolites known as "X" and "Y" crystalline zeolites are regularly shaped, discrete particles generally of a particle size in the range of 0.05 to 10 microns, preferably less than 5 microns when synthetically prepared and used in the catalyst preparation concepts of this invention. The especially preferred zeolite is the "Y" type crystalline zeolite, and the higher the silica to alumina ratio, the better its stability. Generally speaking, the preferred "Y" zeolite will contain a silica-alumina ratio of 4.5 or greater, more usually one containing 5/1 silica to alumina ratio and preferably at least 5.5 to 1 silica to alumina molar ratio.

The zeolites are catalytically activated and stabilized by ion exchange to replace sodium to a desired low level with hydrogen and/or rare earth metal to provide a final catalyst particle composition comprising less than 0.25 wt % sodium oxide. The removal of sodium ions to a very low level and provision of a rare earth exchanged "Y" faujasite characterized as herein provided is much more stable than the hydrogen form of zeolite and this is particularly optimized by providing a high lanthanum content zeolite exchanged before and after calcination of a high silica content zeolite. In particular, when dealing with vanadia, a high lanthanum content crystalline zeolite of at least 7 wt % is especially desirable. These catalytically modified rare earth containing crystalline zeolites are highly active catalytic compositions and most usually require some further modification as by high temperature steaming and dilution in a support or matrix material to restrict the overall catalyst particle activity thereof within acceptable catalytic cracking limits.

In the prior art, catalyst compositions have been prepared so that the matrix comprises silica, alumina or mixtures thereof comprising at least 25 wt % alumina and more usually at least 50 wt % alumina. The matrix material is also known to comprise a clay in an amount of about 10 to 65 wt % of the finished catalyst. Clays such as kaolin, halloysite, montmorillonite and others have been used in the prior art. Also heat and chemically modified clays such as metakaolin and acid treated halloysite can be used. On the other hand, a colloidal dispersion of silica and/or alumina particles (10 to 10,000 A) may be added to a preformed catalyst or catalyst gel to provide a catalyst composition of improved resistance to metal poisoning, as in U.S. Pat. No. 4,198,320. Furthermore U.S. Pat. No. 3,944,482 proposes cracking of a high metals content hydrocarbon feedstock in the presence of a catalyst comprising from 1 to 40 wt % of a zeolite dispersed in a refractory metal oxide matrix providing a pore size distribution in the range of 50-100 Angstroms. U.S. Pat. Nos. 3,972,835; 3,957,689 and 3,867,308 prepare catalysts by neutralizing silicates by adjusting their pH and then adding clay and zeolites to form cracking catalyst.

The improved metal tolerant catalysts of this invention are of a composition comprising at least 35 wt % and more usually about 40 wt % of a select lanthanum rich crystalline zeolite of small particle size in the range of about 0.05 to 5 microns particle size dispersed in a gel or colloidal suspension of silica, alumina or a combination thereof to form a matrix material providing desired intimacy of admixture with the small particles of the select crystalline zeolite herein identified. Preferably a kaolinite clay characterized by a small particle size of about 1 micron size, more or less and providing a pore volume in the catalyst particle complex in excess of 0.30 cc/g. It is preferred that the pore volume be at least 0.32 cc/g and more desirably in the range of 0.4 to 0.8 cc/g.

In one particular aspect of this invention microspherical catalyst particles prepared by the technique of this invention are observed to include hollow shell particles some of which include at least one large major passageway to the interior of the particle shell. Thus the improved and novel catalyst composition of high lanthanum rich zeolite content provides a metals tolerant spherical catalyst particle composition prepared as herein provided which appear to be substantially less diffusion limited and thus remains effective catalytically even with high levels of metal contaminant for a much extended operating period over that heretofore experienced.

It will be recognized by those skilled in the art that the catalyst compositions of this invention are much more highly active catalytically than known prior art compositions because of the high concentration of a select rare earth rich crystallinic zeolite composition of about 40 weight percent dispersed in a select matrix material preferably colloidal as herein identified and providing a high pore volume preferably greater than 0.30 cc/g. That is, a high percentage of a lanthanum rich rare earth exchanged, high silica to alumina ratio CREY zeolite catalyst composition (calcined rare earth exchanged crystalline "Y" zeolite) of high hydrothermal stability is prepared and provided in a high pore volume select matrix material of colloidal ancestrary characterization. The catalyst composition comprises at least 40% of its pore openings being greater than 500 Angstroms, and at least 25% greater than 1000 Angstroms. This characterizaiton statistically provides a catalyst particle composition comprising at least 6% and preferably at least 7% rare earths for more available active cracking sites even in the presence of high metals loading for converting high CRC (Conradson carbon) precursor hydrocarbon feed materials in contact therewith. The use of microspherical catalyst compositions comprising colloidal matrix components and prepared as herein provided is operationally enhanced in the cracking of catalytic hydrocarbon conversion operation by selecting catalyst to oil ratios sufficiently high which will exclude filling more than ⅔ but at least ¼ to ½ of the catalyst particle pore volume with reactant oil feed material as herein identified.

The known literature and prior patent art, teach that metals, such as Ni, V, Fe, Cu and Na are deposited on a cracking catalyst when processing reduced crudes. These metals, particularly Na, are known to effect catalyst activity and selectivity. The prior art also teaches that nickel and to some degree vanadium are especially harmful with regard to producing coke and hydrogen, and thus the metal contaminant level is expressed in terms of nickel equivalents. This is evident from the following equations:

Ni equivalents = 4 Ni + V + Fe

Ni equivalents = Ni + V/4 + Fe/5

In an investigation to identify catalyst compositions most suitable for converting reduced crudes in the presence of large amounts of metal, vanadia was identified as by far the most destructive of the metal contaminants, followed by sodium. Nickel appeared to be the least destructive. Vanadia, as vanadium pentoxide, causes irreversable destruction of the crystalline zeolite structure, rapidly producing a much lower activity material of or approaching amorphous nature. Sodium does lead to permanent neutralization of the zeolite acid cracking sites. Nickel leads primarily to temporary neutralization of the cracking sites by promoting dehydrogenation and deposition of carbonaceous materials.

The catalyst compositions of this invention may be employed in a number of different apparatus arrangements known in the art or yet to be devised which permits low reactant residence time less than 3 seconds and more usually in the range of 0.5 to 2 seconds between a hydrocarbon feed, vaporous conversion products and catalyst particles at temperatures providing desired catalytic hydrocarbon cracking or conversion to more useful products. The product vapors are recovered at a temperature within the range of 950° to 1150° F. but more usually not above about 1100° F. In cooperation with the hydrocarbon conversion operation is a regeneration system or operation designed to restrict catalyst regeneration time and temperatures below 1500° F. and more usually below 1400° F. so as to produce a recoverable CO rich flue gas. The catalyst regeneration operation is designed to provide a regenerated catalyst of low residual carbon content and preferably less than 0.1 wt %. In a more particular aspect it is preferred employing at least two stages of temperature restricted catalyst regeneration operations in combination with one or more catalyst stripping operations which will operate in conjunction with one another to reduce the exothermic temperature rise encountered during the removal of relatively large deposits of hydrocarbonaceous materials and some metal contaminants contributed by cracking reduced crudes. More particularly a two stage oxygen containing gas regeneration operation is contemplated or one stage thereof may be replaced by using $CO_2$ to remove hydrocarbonaceous component material in combination with a relatively high temperature stripping operation to remove hydrogen, sulfur and nitrogen. In this catalyst regeneration operation and sequence of temperature restricted contact steps, it is contemplated in one particular embodiment of relying upon high temperature $CO_2$ to remove some hydrogen and some carbonaceous deposits in one or more stages and such an operation may be intercepted by oxygen combustion removal of a portion of the deposited carbonaceous material by burning to produce a CO or $CO_2$ rich flue gas recovered from the operation. In any of these regeneration combinations it is particularly desirable to restrict the temperatures of oxygen combustion to relatively low levels, preferably below about 1450° F., which will provide recoverable CO rich or $CO_2$ rich flue gases. Removing hydrogen in hydrocarbonaceous deposits with $CO_2$ as well as carbon to produce recoverable CO improves measurably the overall heat balance of the combination operation and reduces potential temperature excursion changes to the catalyst under elevated temperature hydrothermal conditions.

DISCUSSION OF SPECIFIC EMBODIMENTS

The present invention particularly relates to the preparation and method of use of novel catalyst compositions and is particularly suitable for the conversion of high boiling hydrocarbons comprising carbometallic oil component of asphaltenes, naphthenes and and porphyrins. More particularly, the present invention is directed to the characterization and preparation of a select novel class of high activity hydrocarbon conversion catalyst compositions suitable for use in converting high boiling hydrocarbons comprising components boiling above 1025° F.

The flexibility of this invention permits the preparation of catalysts incorporating the following features especially suitable for these catalysts utilized in reduced crude conversion. Ranges of special interest are indicated as follows:

(1) Cracking Activity—providing at least 20 wt % up to 45 wt % of a hydrogen or rare earth [exchanged before and/or after calcination of a] "Y" faujasite crystalline aluminosilicate or crystalline zeolite of high silica to alumina ratio at least equal to 4.5/1 and preferably greater than 5.0/1 silica-alumina molar ratio.

(2) Cracking Activity—preparing a final catalyst composition of low sodium content from low sodium ingredient material and comprising less than about 0.40 wt % sodium oxide and more preferably no more than about 0.25 wt % thereof.

(3) Hydrothermal Stability—improving the catalyst hydrothermal stablility with either a hydrogen exchanged "Y" or a combination of rare earth exchanges to provide a high lanthanum to cerium ratio in excess of 1/1 in the catalyst composition and particularly the zeolite component thereof, and preferably greater than 3/1, and provide a catalyst particle composition comprising a rare earth oxide content of at least 3 wt % and preferably greater than 5 wt % rare earth oxides.

(4) Diffusion and Pore Blockage—employing a matrix material composition comprising one or more components of colloidal ancestry or convertable to colloidal suspensions. Preferably the matrix is of a composition providing a substantial portion of its pore size openings comprising 40 or more percent thereof at least about 500 Angstroms; at least 25% greater than 1000 Angstroms of sufficient large pore size openings so that the highest molecular weight components of the feed will be adsorbed without causing undesired pore blockage; so that diffusion problems associated with the escape of cracked material are minimized; and so that the deposits of metals in the large pores also do not cause substantial pore blockage or diffusion problems. Thus it is also contemplated employing different amounts of at least two different pore size providing colloidal suspensions of different particle size in forming the matrix composition of the catalyst particle composition of this invention. This variation in pore size openings as well as pore volume is used as a basis for varying particle porosity and attrition resistance properties of a spray dried microspherical catalyst particle composition. Thus, colloidal suspensions of different size silica colloid or alumina colloid or a combination thereof may be employed to achieve a binder matrix material for the zeolite component of desired porosity and hardness.

(5) High Boiling Oil Component Absorption—the matrix material of the catalyst composition, whether acidic or neutral, is preferably of large pore volume greater than 0.30 cc/g and comprising substantial pore size openings of at least 500 Angstroms up to and including 1000 Angstroms so that the highest boiling components of a reduced crude feed not completely vaporized upon contact with freshly regenerated catalyst at temperatures up to 1350° F. can crack and a product of cracking enter the select zeolite pores for catalytic upgrading in preference to coating the catalyst particle surface and causing undesired particle agglomeration. It is also important to encourage condensation products of reduced crude cracking to deposit on the catalyst rather than parts of the apparatus employed and such deposition is particularly influenced by employing the catalyst to oil ratio herein defined in conjunction with the large pore size opening and pore volume defined. The catalyst compositions of this invention therefore are provided with a high pore volume preferably greater than 0.30 cc/g.

(6) Matrix Material—the matrix material of the catalyst compositions of this invention can be either relatively inert or active with respect to cracking activity. Preferably the matrix composition is an acidic acting material which will ensure that both thermal and catalytic cracking of absorbed and adsorbed high boiling hydrocarbon components are accomplished. Thermal or catalytic conversion of high molecular components to form lower molecular weight component materials which may be further converted under more selective crystalline zeolite cracking conditions in a reaction zone is an important aspect in the utilization of the select lanthanum rich high zeolite content catalyst of this invention. Thus in reduced crude conversion the combination of high pore volume - large pore size when combined with catalytically active matrix material is relied upon in substantial measure to thermally and catalytically convert high molecular weight high boiling metallo-porphyrins and asphaltenes or Conradson carbon precursors so that metal components thereof are deposited preferably on the matrix surface rather than on the select crystalline zeolite component of the catalyst. In addition, the matrix acidity may be particularly desired to selectivity adsorb the basic heavy nitrogen compounds so that they also are restrained from entering the zeolite structure, whereby neutralizing the special zeolite cracking sites can be more desirably restrained over an extended period of use. The matrix material of this invention may be provided with added acidity by the addition of one or more materials such as sulfonates, phosphates, a halogen contributing material, phosphoric acid, boric acid, acid activated clay, silica-alumina, silica-titania, silica zirconia and other such acid contributing materials.

(7) Matrix and Metals Control—one of the important functions of the catalyst compositions of this invention is related to effecting a control on the metals deposited from cracking reduced crude containing portions of crude oils and comprising carbo-metallic components. As discussed herein, these carbo-metallic components comprising Conradson carbon contributors and deposited metals including particularly Ni, V, Fe, and Na of which vanadium has been identified as contributing greater damage to the catalyst zeolite component than either sodium, iron or nickel with sodium being the second most damaging. Thus the special matrix material or compositions comprising the catalyst composition of this invention and prepared from low sodium materials, because of its provided pore volume and substantial pore size openings of at least 500 to 1000 Angstroms, entraps metals and accumulates them to a much higher order of magnitude heretofore not possible with much lower pore volume matrix containing catalyst of the order of about 0.22 cc/gm. This metal entrapment provision of the catalysts prepared according to this invention is made even more effective and novel by the employment of one or more vanadia immobilization materials which will complex therewith to form compositions which melt at a temperature above the temperature normally encountered in the catalyst regeneration operation in which employed. Thus the matrix material or composition contemplated by this invention prepared from gels and/or colloids of silica, alumina or a combination thereof as identified herein in admixture with small particles of clay material or a second metals entrapment zeolite material identified herein ties up the deposited metals before they can reach and/or react with the special or select zeolite structure defined above to destroy it or cause catalyst particle coalescence and agglomeration as herein discussed. Materials suitable for acting as a metals accumulator and vanadia immobilization agent particularly includes an alumina material incorporated in the matrix, a pillared interlayered clay material and selected metal additives which complex with vanadia to form higher melting mixtures than encountered during regeneration such as identified in applicants copending application Ser. No. 06-277,752; filed 3/30/81, and Ser. No. 06-252,967; filed 4/10/81, the subject matter of which is incorporated herein by reference thereto.

The above ranges of parameters are particularly suited to reduced crude conversion (RCC), but the invention is not limited to such ranges.

The select novel class of catalyst compositions identified by this invention serve a multiplicity of functions as herein identified when prepared to include the compositional parameters and components herein identified. The preparation of such catalytic materials also embodies or contemplates the inclusion of cheap filler and/or binder material as required, but more importantly a material which permits achievement of metals entrapment and enhancement of the desired pore size opening and volume structure in the manner above identified. Some materials suitable for this purpose include carbon black such as identified in applicants copending application PCT-US81-00492, filed 4/10/81, a high purity very fine kaolin clay, alumina and certain ball clays. In this regard an acid leached montmorillonite, bentonite, or halloysite are also possible candidates and can also serve to provide acidity in the matrix as well as being used as a binder material.

ADVANTAGES OF USING A COLLOID BINDER MATERIAL

It is known from the literature that colloidal silica and colloidal alumina are stable dispersions of millimicron-sized particles in water or other suitable liquid medium. The tiny particles are generally spherical in shape and may be uniform or varied in size. Because the particles are so small their collective surface area is extremely large. This combination of particle size colloidal material and large surface area provides unique intimacy properties desired in the preparation of catalysts of this invention and make them commercially unique in a wide variety of applications as herein briefly discussed.

Colloidal particles represent a subdivision state between a course suspension and a truly dissolved one. Colloids exhibit properties more like the dispersing medium rather than the dispersed phase. Colloidal particle sizes are usually expressed in millimicrons (one-millionth of a millimeter) and a colloidal size range is between 1 and 1000 millimicrons. To more particularly identify potential intimacy with such materials, the small quantity of seven grams of silica sol (colloid) with a particle size of 5 m$\mu$ have a surface area about equal to that of a football field.

Figure 1:
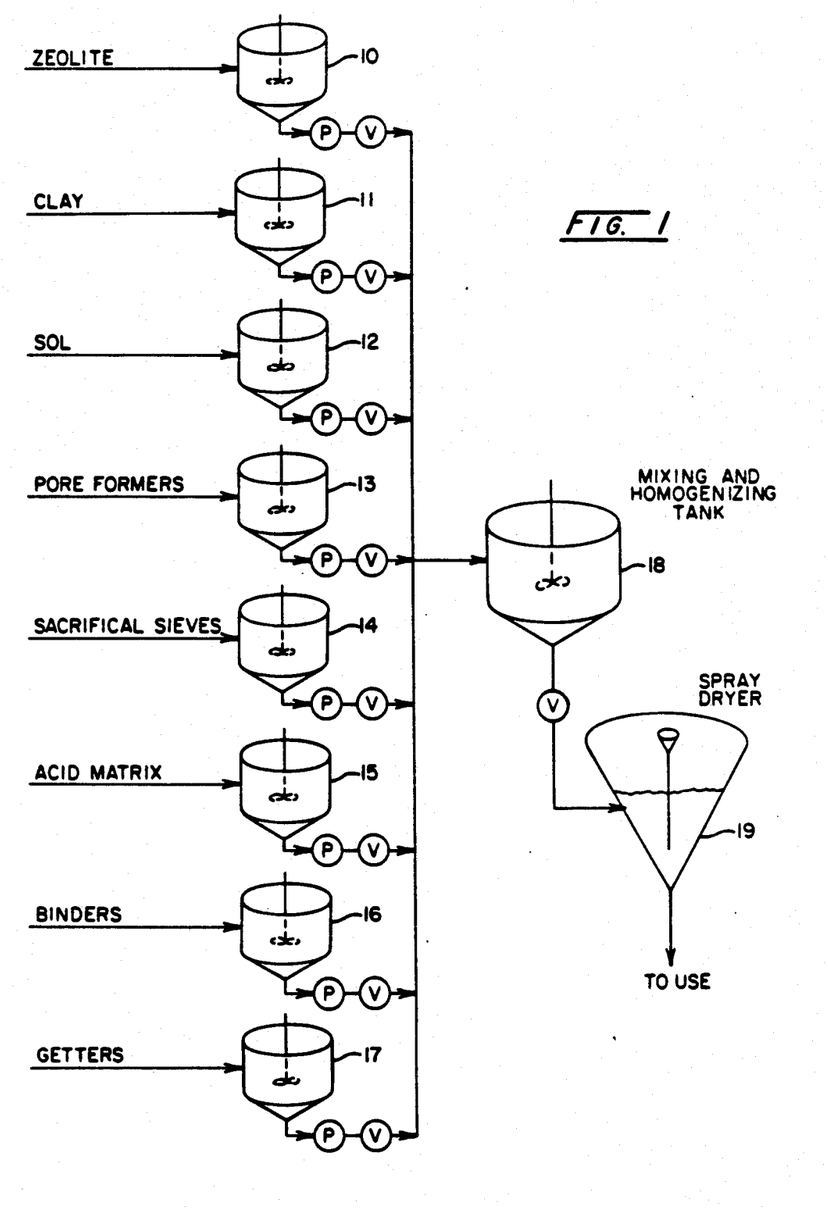
FIG. 1 is a schematic diagram of a preferred embodiment of this invention.

The catalyst compositions of this invention rely particularly upon the intimacy of contact between ingredients (Z-M-A) zeolite-matrix-additive identified herein and prepared as herein provided for the following reasons:

(1) The desirability of a catalyst preparation procedure of starting with low or no sodium component ingredients (Z—zeolite, PV—pore volume additive, C—clay filler, M—matrix material, A—metal additive, ZS—sacrificial sieve, B—binder, G—getter of the attached table and FIGURE), allows one to simply mix suspensions or a slurry of the ingredients and spray dry to obtain useful catalyst particles. Thus it is now recognized that there is no need to go to the long drawn out steps and expense of washing, exchanging, drying and calcining formed spray dried solids to remove undesired levels of sodium. Thus, the simplified catalyst preparation methods contemplated by this particular invention eliminate substantial cost to a refiner and catalyst preparer as well the time, equipment and labor required for matrix preparation and catalyst component mixing, particle formation and optional treating steps associated therewith, and the costly post formation steps of rewetting dried particles, washing extensively and redrying for shipment. It even contemplates elimination of shipment, it being visualized that catalysts of highly valued industrial application can be manufactured at point of use. Also the invention eliminates the need of heating the catalyst preparation in order to control gel time. This method of preparation allows flexibility in variation of catalyst composition ingredients to optimize the variation in feedstock qualtiy parameters such as metal content, Conradson carbon, amount of material boiling above 1025° F. and the like.

(2) The special catalyst preparation procedure associated with colloidal suspensions allows each starting component (Z-M-A) to be purchased or prepared individually and separately stored until use is required thus eliminating expensive gellation time, washings to remove sodium salts and complicated, time consuming treatments on the final spray dried catalyst microspheres. Further treatment of the spray dried microspheres may have some beneficial effects on some of the catalyst components thereof but they may also have some harmful results on other components of the catalyst composition. For example, if one exchanges the catalyst microspheres to put additional rare earths into the zeolite, one would also exchange and adsorb rare earths into any clays, sacrificial sieves, selective adsorbents, matrix acid sites which are present. Unless one intends to have these rare earth cations adsorbed in this manner, consumption and costs of these exchanged rare earths may be undesirably increased. However by starting with little or no sodium in individual catalyst ingredients or by first separately exchanging each ingredient Z-M-A of the catalyst composition for optimum Na removal, preferred exchange conditions may be provided for each component before ultimate mixing as by homogenization of the ingredients to form a slurry mix for spray drying following the varied catalyst preparation techniques of this invention.

(3) Excess electrolytes (mainly $Na^+$) are desirably removed from low sodium starting colloidal suspensions, so that higher pH's approaching a pH of 5.5 may be used for an acidic colloidal suspension without causing the colloids to gel. A colloidal suspension thus formed may be more concentrated, and can be mixed more vigorously in a homogenizer and/or even heated to a higher temperature without causing gellation to occur. The flexibility of the desired microspherical catalyst manufacturing process of this invention is thus greatly increased. The use of a pH between 3.5 and 5.5 will eliminate substantial acid destruction of the zeolite crystal structure normally found in other catalyst preparation procedures. Also of more significant importance is the recognition that the low electrolyte colloidal suspension is also more stable over an extended time against gelling or gel formation. The sols (colloidal suspensions) thus prepared can be made before time while quality control testing thereof is conducted or they can be purchased on the open market from a number of suppliers, thus eliminating all need for related manufacturing equipment. The ultimate financial value of such an approach is readily perceived by one skilled in the art. Thus a more uniform ultimate spray dried catalyst composition will result and can be relied upon or varied as desired between preparations.

(4) The particle size of the binding colloid may be preselected on an individual batch basis so that one can vary the physical properties of the final catalysts. Thus different amounts of two or more colloidal suspensions of the same or different average particle sizes and composition may also be used to vary porosity, acidity and attrition of an ultimate catalyst composition prepared from the selected colloidal suspension.

(5) The catalysts prepared by the procedure and techniques of this invention from low sodium or no sodium colloids will have a desired very low sodium content so that any soluble sodium coming in contact with the special low sodium rare earth exchanged crystalline zeolite composition herein identified and particularly preferred will not be subjected to a back exchange of sodium into the zeolite.

(6) Since silica sols (colloids) are most stable in two ranges of pH on either side of about 5.5 to 7 pH, acidic in the range of 3.5 to 5.5 and basic sol in the range of 7 to 13 such colloidal suspensions may be used with considerable advantage. For example, this procedure permits preparation of catalysts on the high pH side as well, by replacing sodium or other poisonous and destructive cations with non-harmful cations such as ammonium ion; monomethyl, dimethyl, trimethyl and tetramethyl ammonium ions; and other organic bases of a similar nature. Since NH4+ or H+ cations are used to stabilize such sols, some additional exchange of sodium out of a zeolite may be experienced in some selected cases. When employing catalyst compositions prepared from acidic sols some rare earths may be added to the spray dryer feed to achieve a final rare earth exchange even during the catalyst forming sequence.

(7) The catalyst preparation technique and method of this invention will allow one to use or incorporate $TiO_2$, $ZrO_2$, $Al_2O_3$, and $Sb_2O_3$ sols and gels for preparing carbo-metallic reduced crude conversion catalysts.

(8) The catalyst preparation technique also permits one to use metal oxide coated sols such as $TiO_2$, $ZrO_2$, $Re_2O_3$, $Cr_2O_3$, $Fe_2O_3$ or $Al_2O_3$ coating on a silica and/or alumina particle to prepare reduced crude conversion catalysts.

(9) The catalyst preparation technique of this invention also permits one to place relatively uniform coatings of the sol material on the clay and zeolite particles.

(10) Furthermore, it is also speculated that the higher surface area of the colloid used to prepare the matrix material will improve the rate of deposition and adsorption of metals from the hydrocarbon feed onto the colloid surface.

FIG. 1 is a schematic drawing of one embodiment of the process and apparatus of the invention. In FIG. 1, a series of agitated mixing vessels 10-17 prepare various ingredients for feeding to mixing and homogenizing tank 18.

Zeolites: Zeolites purchased from any of the usual suppliers, e.g. Davison, Division of W. R. Grace, Union Carbide Corporation, Philadelphia Quartz or other suppliers with the sodium having been substantially removed by ion exchange (with hydrogen, ammonium, or rare earths, etc.) is mixed with demineralized water to form a slurry which is transferred (through suitable pipes, valves, and instrumentation) into mixing and homogenizing tank 18. Suitable commercial zeolites include CREY, RECREY, Ultra-stable Y, HY, ZSM-5, High Silica Zeolite (HSZ) and others.

Clay: Clay obtained from any clay manufacturer is mixed with demineralized water and slurried in mixing tank 11 and thereafter transferred to mixing and homogenizing tank 18. Suitable clays include kaolin, halloysite, acid leached montmorillonite, synthetic montmorillonite and others. In most cases, the clays are shipped wet and require only minor amounts of additional water to form a pumpable slurry.

Sols: Low-sodium sols are mixed with demineralized water and slurried in mixing tank 12 and thereafter transferred to mixing and homogenizing tank 18. Suitable sols may be purchased from Nalco, Dupont and other manufacturers or the sols can be made by well-known techniques and washed with sodium-free acids (low pH) or ammonium or other bases (high pH) to remove sodium. Suitable sols include alumina, silica-alumina, titania, zirconia, antimony trioxide. These can be purchased sodium-free or purchased with sodium content which is removed by leaching tank 12.

Pore Formers: In mixing vessel 13 under our prepared slurries of pore formers, preferably carbon black, carbon black should be selected to give the desired pore size and thermal furnace or other blacks may be employed as desired. The finished slurry is transferred to mixing and homogenizing tank 18.

Sacrificial Sieves: Slurries are formed with demineralized water as before utilizing, in mixing vessel 14, zeolites, for example, those available commercially from the Davison, Division of W. R. Grace, PPG, Proctor & Gamble Company. Suitable zeolites include zeolite A, ZSM-5, mordenite, chabazite, co-gelled $SiO_2$-$Al_2O_3$ all suitable washed to remove sodium. The contents of tank 14 are, as with the other ingredients, transferred by suitable lines and pumps to mixing and homogenizing tank 18 for the preparation of the catalyst.

Acid Matrix Substances: In mixing tank 15, demineralized water is used to prepare slurries of acid matrix substances such as finely ground gels, e.g. silica gel, silica-alumina gel, titania-silica, etc. These acid matrix substances can be purchased from Davison or PPG as aforementioned. The finished acid matrix slurry is transferred to mixing and homogenizing tank 18, as above described for other slurries.

Binders: In mixing tank 16, demineralized water is used per a slurry of acid leached bentonite, acid leached halloysite, pseudoboehmite, silicic acid, synthetic montmorillonite or other suitable catalyst binder well known to those skilled in the catalyst arts. The resulting slurry is transferred to mixing and homogenizing tank 18.

Getters: In tank 17, there are prepared slurries of demineralized water and suitable getters, e.g. compounds which will immobilize metals, e.g. vanadia and/or nickel, sodium or iron, by trapping the foregoing metals by reaction or association. Suitable getters include titania, alumina, zirconia, indium oxide, manganese dioxide, lanthanium oxide and others known to the art. These are slurried with demineralized water and fed to mixing and homogenizing tank 18.

In each of the above discussions, by low-sodium is meant that the ingredient should have a sodium content after washing and at time of feeding to mixing and homogenizing tank 18 such that the aggregate sodium content of the mixture in tank 18 contains more than about 0.5 weight percent, or preferably 0.2 weight percent and most preferably below about 0.1 percent.

The mixing vessels, as with the plumbing and instrumentation, employed in the above schematic description of the inventions, may be of any suitable composition and configuration. The single mixing vessel may be used for successively producing a series of batches of the various ingredients. The process may be practiced continuously with flow mixers being employed in lieu of mixing vessels. Temperatures and pressures will not be narrowly critical and will be those which are convenient for the economic preparation of the desired pumpable slurries. The vessels may, in some instances, be compartments of a transport vehicle, e.g., a compartmented tank truck or rail car which prepared slurries can be shipped for custom blending at or near the point of use of the catalyst.

In fact, it is an important feature of the present invention that by stocking ingredients at or near the point of use, the usual delays involved in ordering and delivery of catalysts can be avoided and catalysts can be custom blended to optimize their compositions to accommodate variations in feedstock, e.g., those noted in a pipeline which is delivering successive batches of varying composition which would most desirably be converted by means of catalyst of different composition.

Of course, conversion operations for certain feedstocks and under certain conditions will permit the toleration of higher amounts of sodium and in such instances deionized water be substituted for demineralized water and higher sodium contents may be accepted in the mixing and homogenizing tank and in the final catalyst.

The percentage of each of the above ingredients will vary with the zeolite content being preferably in the range of about 10 to about 60, more preferably from about 15 to about 50 and most preferably from about 20 to about 40, the clay content being from about 0 to about 60, more preferably from about 0 to about 45, and most preferably from about 10 to about 35; the sol content being from about 0 to about 40, more preferably from about 10 to about 30, and most preferably from about 20 to about 25; the pore former content being from about 0 to about 25, more preferably from about 0 to about 20, and most preferably from about 0 to about 15 as measured on the volatile free finished catalyst; the sacrificial sieves content being from about 0 to about 20, more preferably from about 0 to about 15, and most preferably from about 0 to about 10; the acid matrix substance content from about 0 to about 50, more preferably from about 0 to 35, and most preferably from about 0 to about 20; the binders content being from about 0 to about 60, and, depending on the physical and temperature conditions which the finished catalyst must undergo, more preferably from about 0 to about 45, and most preferably from about 10 to about 35; and the getter content may be from about 0 to about 20, more preferably from about 0 to about 15, and most preferably from about 0 to about 10 percent by weight based on weight of the finished catalyst.

The composite of slurries will be thoroughly mixed and homogenized in tank 18 to obtain a highly uniform composition which is then transferred by suitable pumps, piping and instrumentation to spray drier 19 through suitable nozzles to form catalyst pellets of the required size. Spray drying techniques will be those well-known as conventional to those skilled in the catalyst preparation art. In specialized circumstances, pelletizing may be substituted for the spray drier and in other circumstances, the slurries may be spray dried in situ by injecting them into one or more stages of the catalyst regeneration system in a normal RCC or FCC unit.

CATALYST PREPARATIONS

EXAMPLE 1

A reduced crude conversion catalyst comprising about 40 wt % of a select zeolite comprising a calcined rare earth exchanged "Y" zeolite known as CREY which is further rare earth (RE) exchanged after calcination will provide a particularly desired lanthanum rich (La/Ce=3/1) zeolite. This material identified as a RECREY zeolite herein, has a sodium content of about 0.47 wt % or less. This special zeolite composition of desired small particle size is intimately mixed with about 25 wt % of a silica sol (colloid) binder material to form a suspension thereof. The initial silica ($SiO_2$) sol suspension of this example is provided in the form of a stabilized acidic sol with a pH up to about 5. The specific catalyst preparation is as follows:

(1) To 4.0 L (liters) of 4.0 pH demineralized water prepared with HCl is mixed 4.30 kg of commercial Hydrite UF Kaolinite defined below to form a suspension thereof. The kaolinite clay is added to the acidic water in at least two portions with vigorous agitation to obtain a slurry or suspension of relatively high viscosity. A dispersant may be added with the clay in an amount in the range of 0.25 to about 2.0 wt % and more usually at least about 0.5 wt % of the clay. The alkali metal content of the clay is considered to be relatively tightly bound and thus does not normally appear to provide a significant level of free alkali metal or ionizable metal for exchange into the special zeolite identified above when added together. However, when desired, the clay may be exchanged or washed before use with such cations as $NH_4+$ to lower its sodium content.

(2) A slurry of the special RECREY zeolite above identified and preferably of low sodium content is prepared by mixing 3.0 L of 4.0 pH water with 4.2 Kg of well dispersed and finely ground RECREY (a rare earth exchanged calcined rare earth exchanged "Y" faujasite crystalline zeolite). The special zeolite is finely ground to particles of less than 5 microns and preferably to at least 1 micron to aid in obtaining a well dispersed zeolite.

(3) The kaolinite slurry obtained in step (1) is placed in a homogenizing mixer with 4.8 L of Nalco's 1034-A colloidal silica defined below and comprising less than 0.05 wt % $Na_2O$ and mixed thoroughly for about 5 minutes.

(4) After mixing the colloidal silica with the clay, the wetted zeolite slurry prepared in (2) above is added slowly to the silica-clay slurry in the homogenizer. The rate of addition and dilution when required is adjusted to obtain and maintain a smooth slurry suitable for spray drying to form microspherical solids. The solids thus combined are blended for about 15 minutes in the homogenizer or under sufficiently long mixing conditions to obtain a slurry of about 4.0 pH with a viscosity of 900 cps at 100° F.

(5) The slurry thus obtained in step (4) and comprising silica colloid, clay and crystalline zeolite is then spray dried to form microspherical catalyst particles comprising about 25 wt % silica, 35 wt % clay and about 40 wt % of the special La rich RECREY zeolite. Apparatus suitable for this spray drying purpose include a Niro atomizer maintained at an inlet temperature of about 400° C. (752° F.) and an outlet temperature of about 120° C. (248° F.). Other known spray drier apparatus suitable for the purpose may be employed and the viscosity of the slurry may be adjusted as required to optimize the spray drier operation. Microspherical catalyst particles of fluidizable particle size are recovered from this spray dry operation which may then be used for hydrocarbon conversion as herein provided.

When it is desired to incorporate rare earth components with the matrix as well as the zeolite, a further step of water washing and rare earth exchange one or more times is contemplated. Rare earth salts can also be added directly to the slurry and then run to the spray drier. In the event that such is desired, it is proposed to employ in a specific example about 5 L of 65° C. water for each kilogram of catalyst solids. The washed catalyst particles are exchanged several times, three for example, with 4 L of a 0.15N rare earth chloride solution which contains a La/Ce ratio greater than about 2. The exchanged catalyst solids are then water washed several times to provide solids comprising less than 0.1 wt % sodium which is then dried at a temperature of about 150° C. (302° F.) for several hours or as long as required.

A Hydrite UF kaolinite clay, commercially available is identified as providing a medium micron particle size of about 0.20; a pH in the range of 4.2–5.2; a 325 mesh residue maximum % of 0.20; and an oil adsorption of 47. The wt % composition is:

| | | | |
|---|---|---|---|
| Aluminum oxide | 38.38 | Calcium oxide | .05 |
| Silicon dioxide | 45.30 | Magnesium oxide | .25 |
| Iron oxide | 0.30 | Sodium oxide | 0.27 |
| Titanium oxide | 1.44 | Potassium oxide | .04 |

The elements of Ti, Ca, Mg, Na and K appear to be so tightly bound in the clay that no detectable exchange of these materials into the high lanthanum containing CREY zeolite initially prepared as above defined for low residual sodium content is observed. Thus, any free sodium content of the formed microspherical catalyst particles is thus essentially restricted to that contained in the zeolite or added by the oil feed during hydrocarbon conversion.

Nalco 1034A colloidal silica or silica sol is a colloidal dispersion of submicron size silica particles, in the form of tiny spheres of $SiO_2$ in an aqueous medium. It is an acidic pH aqueous colloidal silica product commercially available. A general description of this material is as follows:

| | |
|---|---|
| Colloidal Silica, $SiO_2$ | 34% |
| pH | 3.1 ± 0.5 |
| Average Particle Size | 16–22 mµ |
| Average Surface Area | 135–190 m²/gram |
| Specific Gravity @ 68° F. | 1.230 |
| Viscosity @ 77° F. | <20 cp |
| $Na_2O$ | <0.05% |

The sodium content of this silica colloid is so low that the percentage of silica in the microspherical catalyst particles does not materially influence the sodium content of the catalyst particles.

It will be recognized by those skilled in the art from the description herein presented, that the preparation of fluidizable microspherical particles may be varied considerably in composition employing the basic procedure of Example 1 and will produce as desired a high activity high zeolite content cracking catalyst of desired very low sodium content. The basic operating procedures of this example may be varied by inclusion of different additive materials and by employing one or more colloidal materials such as an alumina colloid with the silica colloid or different particle size silica colloids may be employed as discussed above.

EXAMPLE 2

The zeolite cracking catalyst of this example is prepared in a manner similar to that of Example 1 except for using at least one basic ammonium stabilized $SiO_2$ sol (colloid) to produce microspherical catalyst particles containing about 40 wt % of the special RECREY zeolite which is lanthanum rich and prepared as defined above in combination with about 35 wt % of a fine kaolinite clay of less than 5 micron particle size above defined and about 25 wt % of a colloidal silica binder material defined below.

(1) 2 L (liters) of a 10 pH water is prepared using ammonia hydroxide and demineralized water. To this basic water solution is mixed 4.7 Kg of RECREY zeolite (La/Ce 3/1) obtained as provided in Example 1 in two or more portions to obtain a smooth wetted powder mixture.

(2) 4.5 L of Nalco's 2327 (an ammonia stabilized) colloidal silica (defined below) is added to a homogenizing mixer as a slurry suspension and while mixing, 3.8 Kg of Hydrite UF kaolinite clay above defined is added to the silica sol (colloid) slurry suspension in the mixer. The rate of addition is adjusted to maintain a well blended and smooth slurry.

(3) Next the wetted finely ground RECREY zeolite or slurry obtained by step (1) is added to the well blended slurry above obtained in step (2) while mixing to obtain a further well-blended slurry mixture comprising the special RECREY zeolite, finely ground clay and colloidal silica. The slurry mixture thus formed is mixed for an additional time as required to form a smooth slurry with water adjustment as required to obtain a sprayable slurry of about 9 pH and providing a viscosity of about 200 centipoise (cps) at a temperature of 140° F.

(4) The slurry formed in step (3) above is thereafter spray dried in one specific embodiment in a manner similar to that described in Example 1 to form microspherical particles employing a spray drier inlet temperature of about 400° C. and a 120° C. outlet temperature. The spray dried catalyst microspheres thus obtained may be further treated or exchanged if desired with a rare earth chloride solution as described with respect to Example 1 when it is desired to incorporate more rare earth material in the catalyst microsphere and particularly the matrix component thereof.

Nalco 2327 Ammonia Stabilized Colloidal Silica is described as comprising:

| | |
|---|---|
| Colloidal Silica as $SiO_2$ | 40% |
| pH | 9.2 |
| Average Particle Size | 20 mµ |
| Average Surface Area | 150 m²/gram |
| $Na_2O$ | <0.1% |
| $NH_3$ | 0.2% |

EXAMPLE 3

In this example, catalyst particles comprising the special lanthanum rich zeolite such as RECREY prepared as described in Example 1 is mixed with islands of alumina (aluminum oxide) supplied as Catapal alumina and a Hydrite UF kaolinite clay to produce a catalyst composition comprising about 40% RECREY; 25% silica; 25% of clay and 10% of Catapal alumina. Catapal alumina is an alumina gel-like material which upon dispersion is returned to a colloidal-like suspension. This colloidal material can also be used to prepare similar catalysts and will be described in later examples. The preparation procedure is as follows:

(1) Add 5.2 Kg of finely ground Hydrite UF kaolinite to 10 L of Nalco 2327 colloidal silica (ammonia stabilized) defined in Example 2 in a homogenizing mixer to form a slurry and agitate for several minutes up to about 5 minutes to obtain a smooth slurry.

(2) Add about 250 ml or sufficient concentrated ammonium hydroxide to the slurry product of step (1) to obtain a 10 pH slurry comprising finely divided kaolinite and colloidal silica.

(3) With continued mixing, add about 2.1 Kg of a commercially available and finely ground Catapal alumina powder (defined below) to the colloidal silica-clay slurry of step (2). The rate of addition of the Catapal alumina and mixing thereof is selected to obtain a well blended slurry of the three components.

Catapal SB alumina is identified as an ultra high purity alpha alumina monohydrate (Boehmite) prepared as a white spray dried powder. It is often utilized as a high purity catalyst support material. It is converted to gamma alumina by calcination at 900° F. for about 3 hours. A typical chemical analysis (wt %) is as follows:

| | | | |
|---|---|---|---|
| $Al_2O_3$ | 74.2 | $Na_2O$ | .004 |
| $SiO_2$ | .008 | Sulfur | <.01 |
| $Fe_2O_3$ | .005 | | |

Particle size distribution is identified as:
48% <45 microns
12% >90 microns (4) The slurry obtained in step (3) above is adjusted to a pH of 10 with concentrated ammonium hydroxide.

(5) To the pH adjusted slurry of step (4) is added finely ground zeolite in an amount of about 8.3 Kg of the special RECREY powder obtained as defined in Example 1 with careful mixing during addition at a rate to obtain a well-blended slurry. Water may be added to this slurry mix to adjust the viscosity thereof for subsequent efficient spray drying of the slurry mix as herein discussed.

(6) The slurry mix formed in step (5) is in one example spray dried using a 400° C. inlet temperature and a 120° C. outlet temperature similarly to that described in Example 1 to form fluidizable microspherical catalyst particles.

(7) The spray dried microspherical catalyst particles obtained are of a sodium content less than 0.25 wt % and may be used as obtained in a reduced crude cracking operation. However, one may also subject the spray dried particles to additional water washing and rare earth exchange as discussed with respect to Example 1 when it is desired to particularly incorporate rare earth material also in the matrix.

EXAMPLE 4

The procedure of this example is followed for producing a catalyst that differs from Example 3 in that an acid sol is used and Catapal alumina is also included in the catalyst particle.

(1) Add 50 ml of concentrated HCl to 7 L of $H_2O$ and thereafter add 7.4 L of Nalco 1034A silica sol (colloid) above identified to produce a silica sol with about a 2.5 pH.

(2) Next Mix 3.1 Kg of finely ground Hydrite UF kaolin and 30 gm of a low sodium dispersant to the silica sol of Step 1.

(3) Add 1.2 Kg of finely ground Catapal alumina to the mixture of step (2) and continue to mix several minutes sufficient to obtain a smooth slurry mixture of the ingredients.

(4) The pH of the resulting slurry of step (3) is pH adjusted to about 3.0 by adding 150 ml of concentrated HCl before carefully mixing 5.0 Kg of finely ground RECREY identified in Example 1 into the slurry. The resulting pH is adjusted to be about 3.50. The slurry mixture thus obtained is mixed for an additional time sufficient to produce a smooth slurry surface for spray drying to form microspherical catalyst particles.

(5) The thoroughly mixed slurry of step (4) and adjusted as required to a suitable viscosity is then spray dried to form fluidizable microspherical catalyst particles in the manner particularly defined as Example 1.

(6) It is also contemplated further treating the spray dried microspherical catalyst particles of this example with additional water wash and rare earth exchange for the reasons particularly discussed in the above examples.

EXAMPLE 5

A. Rare Earth Exchanged CREY (1) CREY (29.6 kg) slurried with 84 L of water was exchanged with 1.7 L of $RECl_3$ solution at 140° F. for 1½ hours. The ratio of equivalents of rare earths to sodium was about 1:1. The slurry was filtered at the end of the exchange.

(2) The CREY filtercake from (1) was slurried with 64 L of water and exchanged again with 1.7 L $RECl_3$ solution at 140° F. for 1½ hours. After this period of time, the exchanged CREY was filtered.

(3) Step (2) was repeated.

(4) The RE exchanged CREY to form (RECREY) from Step (3) was washed three times. Each wash utilized 64 L of water and was carried out at 140° F. for 30 minutes. After each wash, the RECREY was filtered.

(5) The washed RECREY was dried overnight at 150° F.

B. Ammonium Exchanged Hydrite UF Clay (1) Hydrite UF clay (23 kg) was exchanged with 1.15 kg of ammonium chloride in 96 L water at 140° F. for 3 hours. The pH of the slurry was 4.5. The ratio of equivalents of ammonium ion to metals on the clay was 4.6. The clay was filtered at the end of the exchange.

(2) The ammonium exchanged clay was washed with 64 L of water at 140° F. for one hour. The water-clay slurry was filtered in approximately 5 gallon portions. After filtering each portion, the clay was slurried with 3 gallons of water and filtered again.

(3) The exchanged and washed clay was dried overnight at 150° F.

C. Preparation of Spray Dried Catalyst Containing 40% RECREY, 35% $NH_4+$ Exchanged Hydrite UF, and 25% Silica as Acidic Silica Sol (1) Nalco 1034A (6.2 L, 2.6 kg $SiO_2$) and 25 ml hydrochloric acid were mixed in a 5 gallon pail. The pH of the HCl - silica sol was 2.1.

(2) Ammonium ion exchanged hydrite UF (3.6 kg) and 6 L of water were added to the sol from Step (1). The slurry was mixed for five minutes, transferred to the Kady mill and mixed for an additional 5 minutes at 100° F. The pH of the slurry was 3.4.

(3) RECREY (3.6 kg) was added to the silica sol-clay slurry and mixed for 5 minutes. Approximately 8 L of water were added to the slurry to reduce its viscosity. The slurry was then mixed for 15 minutes at 125° F. The pH of the slurry was 3.5. Its viscosity was about 800 cps.

(4) The slurry from Step (3) was spray dried.

EXAMPLE 6

D. Spray Dried Catalyst Containing 40% RECREY, 25%

Ammonium Exchanged Hydrite UF, 25% silica as Silica Sol, and 10% Catapal Alumina (1) Nalco 2327 (6 L, 3.1 kg $SiO_2$) silica sol, 6 L of $H_2O$, and 50 ml of ammonium hydroxide were added to the Kady mill. They were mixed briefly. The pH was 9.5.

(2) Hydrite UF (3.1 kg) was added to the sol from Step (1). The slurry was mixed for 5 minutes at 125° F. The pH of the slurry was 9.1.

(3) RECREY (5.0 kg) was added batchwise to the slurry from Step (2). About 28 L of water and 350 ml ammonium hydroxide were added during the RECREY addition for viscosity and pH control. The larger amount of water was added to reduce the viscosity of the gel that formed during RECREY addition. The slurry was mixed for 15 minutes at 135° F. The pH and visocity of the slurry after mixing were 8.8 and 1500 cps, respectively.

(4) The catalyst was spray dried at inlet temperature of 400° C., an outlet temperature of 120° C., and a pressure of 26 psig.

EXAMPLE 7

E. Spray Dried Catalyst Containing 40% RECREY, 35% Ammonium Ion Exchanged Hydrite UF, 25% Silica as Silica Sol and 10% Carbon Black (1) Nalco 2327 (6 L, 3.1 kg $SiO_2$) silica sol, 5 L of water, and 50 ml of ammonium hydroxide were added to the Kady mill. They were mixed for about 1 minute at 100° F. The pH of the silica sol was 9.7.

(2) Dispersant Norlig NH (37.5 g) was added to the silica sol from Step (1). The sol and Norlig NH were mixed for about 2 minutes.

(3) Carbon black N-347 (1.27 kg) was added to the product from Step (2) and mixed for about 1 minute. The paste that was produced was treated with 8 L of water and 25 g. of Norlig NH. The slurry that resulted was mixed for 5 minutes at 125° F. The pH of the slurry was 125° F.

(4) Ammonium ion exchanged hydrite UF (4.0 kg) and 100 ml $NH_4OH$ were added to the product from Step (3). The slurry was mixed for 5 minutes at 125° F. The pH of the slurry was 9.3.

(5) RECREY (5 kg) was added batchwise to product from Step (4). Approximately 6 L of water, 50 g of Norlig NH, and 600 ml $NH_4OH$ were added during the RECREY addition for viscosity and pH control. The slurry was mixed for 15 minutes at 125° F. The pH and viscosity of the slurry were 8.8 and 700 cps, respectively.

(6) The catalyst was spray dried at an inlet temperature of 400° C., an outlet temperature of 120° C., and at a pressure of 26 psig.

(7) The catalyst from Step (6) was heat treated at 850° F. for about 60 hours and at 1100° F. for 2 hours to burn off the carbon black.

The catalyst preparation techniques of this invention are particularly suitable for preparing a special class of crystalline zeolite containing catalysts broadly referred to as reduced crude conversion catalyst of the following composition:

| 1 | Zeolite content | 10–60 wt % |
| --- | --- | --- |
|   | $SiO_2/Al_2O_3$ (molar) | >5 |
|   | La/Ce (molar) | >3 |
| 2 | Total Rare Earths ($RE_2O_3$) | >3 wt % |
| 3 | Total $Na_2O$ | <0.5 wt % |
| 4 | Pore Volume ($H_2O$) | >0.40 cc/g |
| 5 | ABD | ~0.7 g/cc |
| 6 | Surface Area |   |
|   | (a) Total | >200 m²/g |
| 7 | Particle Size Distribution |   |
|   | (a) 0–40 microns | <10 wt % |
|   | (b) APS | 70 microns |
| 8 | Hydrothermal Stability, MAT (1450° F. for 5 hours, 100% $H_2O$) | >80 |
| 9 | Attrition Resistance |   |
|   | (a) DI | <15 |

-continued

| (b) JI | <2.0 |
| --- | --- |

Numerous variations on the above examples of basic ingredients in the catalyst particles can be made by mixing numerous different additive materials herein identified into the various formed slurries. The purpose of these additives can be to passivate metals, alter selectivities, immobilize metals, or add a dual catalytic function to the final catalyst. These additives may be included as fine solids, colloidal particles, gels or soluable solutions at one or more of the steps in the described catalyst preparation procedures. Furthermore, a titania, alumina or zirconia gel may be combined with the slurry just before spray drying to produce a catalyst with improved metal tolerance. Other additives which may provide beneficial effects such as sacrificial sieves, are more particularly discussed below.

The new and novel catalysts described and prepared according to Example 1 through 4 a were evaluated for their activity characteristics and compared to a high activity catalyst in the patent literature. A catalyst was prepared according to the procedure outlined in U.S. Pat. No. 3,957,689 (Ostermaier-Elliott) and compared to the catalysts of this invention. The activity of these catalysts was measured by the ASTM micro-activity test procedure D-3907-80 and the results given below.

The catalysts were preconditioned by steaming in 100% steam for 5 hours at 1450° F.

| Catalyst Preparation Method | U.S. Pat. No. 3,957,689 | Example 1 | Example 2 | Example 3 |
| --- | --- | --- | --- | --- |
| MAT Conv. Vol % | 80 | 91.8 | 86.5 | 92 |
| Rel. Activity | 175 | 668 | 368 | 699 |

The catalyst prepared as above identified Example 1, 2 and 3 are 2–4 times more active than that described in the patent literature.

The most common crystalline zeolite utilized is a naturally occurring or synthetic sodium "Y" faujasite, which upon a first series of exchange with a rare earth chloride (Ce/La 2/1) solution yields a lower sodium rare earth exchange zeolite called REY (Na=1–2%). A common catalyst preparation practice is to add this crystalline REY of relatively high sodium content to the slurry and then spray dry (a form of calcination) to form catalyst particles. The sodium content of the spray dried catalyst particles is further lowered by water wash and treated with a rare earth salt solution to lower the sodium content of the particles to a range of about 1–2% Na down to 0.7–1.2 wt % Na in the REY component of the catalyst. This type of catalyst preparation (REY-spray drying-RE exchange to yield REY) does reduce costs on the conversion of REY to the calcined material CREY as shown schematically below:

NaY+RE→REY into catalyst slurry→spray dry→RE exchange→CREY in catalyst     (1)

NaY+RE→REY→calcination→RE exchange→RECREY→slurry→spray dry     (2)

However, the further RE exchange of a spray dried and formed FCC catalyst particle containing REY does put a considerable amount of RE salts into the matrix.

As to the matrix materials, sodium salts such as Na aluminate and Na silicate are traditionally utilized for synthesis of the matrix which also contributes a high Na content. This can be reduced by using an acid ($H^+$) or alkaline ($NH_4^+$) wash, but a high sodium content within the matrix still remains and will require several repeated washings to reduce this to an acceptable level. Furthermore, the use of deionized water is useless since it also has a high Na content and thus would require using a demineralized water. If a clay is utilized as a part of or the sole matrix material, the clay also introduces some Na plus other alkaline metals such as K, Ca, Mg and the like. However, clay materials suitable for catalyst preparation normally contain these materials tightly bound to the extent that they do not re-exchange into the crystalline zeolite present. The methods of catalyst preparation of the prior art do not yield the optimum or an idealized RCC catalyst as particularly related to the catalyst hydrothermal stability, its metals tolerance and its activity-selectivity characteristics (zeolite and matrix acidity).

The catalyst preparation techniques of this invention are particularly directed to the elimination of a maximum amount of sodium from the special catalyst ingredients before they are slurried as herein provided and spray dried. The treatment of a NaY crystalline faujasite by the particular sequence comprising rare earth exchange of the zeolite with or without ammonia exchange, calcination and a further rare earth exchange maximizes Na removal from the crystalline zeolite without destroying its crystal structure. Rare earth (RE) inclusion into the zeolite is however substantially increased by calcination of the zeolite between rare earth exchange steps which will yield the particularly desired special zeolites used in this invention of catalyst preparation and comprising sufffciently low sodium that the final catalyst composition will be less than 0.3 wt % $Na_2O$, preferably below 0.25 wt %. The lower the sodium content, the better the catalyst is for reduced crude cracking.

The use of sodium free ingredients such as colloidal alumina, colloidal silica, titania and zirconia and mixtures thereof ensure that little or no sodium is contributed by the matrix material. When a special kaolin clay is utilized as herein defined, as part of the matrix material, the sodium present therein is so tightly bound into the clay that it does not appear to migrate such as to a zeolite mixed therewith. However, even this tightly bound sodium can be partially removed by an acid treatment or by exchanging with $NH_4^+$ or rare earth salts.

The catalyst compositions prepared by the techniques of this invention may be modified to some considerable extent with respect to pore size; matrix cracking activity and metals adsorbing capability. That is, it is also contemplated increasing the pore size openings of the spray dried particles by incorporating, for example, carbon black or other suitable removal material in the slurry composition before spray drying thereof or in one or more wetted mixes of clay or colloidal materials and prior to forming a slurry thereof with the select high lanthanum rich low sodium content crystalline zeolite obtained as herein defined. On the other hand, the metals adsorbing capacity of the catalyst particle may be increased by incorporating yet another metal entrapment material in the catalyst composition and comprising one or more added materials selected from the group consisting of zeolite A, mordenite, chabazite, a cheap naturally occurring faujasite material, a pillared clay material or combinations thereof. The addition of these metals adsorbing materials is limited however to avoid undesired addition of sodium to the catalyst particle in conjunction with preparation of a less expensive catalyst without upsetting desired activity-selectivity characteristics thereof.

In yet another aspect, the primary catalyst composition components of this invention comprising a select lanthanum rich crystalline zeolite, colloidal matrix component and clay component, of a particle size contributing to intimate admixture of the particles may be modified by the addition of one or more acidic promoters to the matrix material such as by adding nitrates, sulfates, phosphates, a halogen contributing material or an acidic silica containing component such as silica-alumina, silica-magnesia, silica-zirconia, silica-titania and others herein identified materials suitable for the purpose.

The catalyst preparation techniques of this invention also encompass some minor variations thereof as identified above with respect to additive materials for passivating accumulated metals in cooperation with the basic catalyst composition ingredients.

In a particular novel embodiment of this invention the slurried catalyst compositions prepared as above defined can be used to contribute several advantages to the catalyst preparation techniques herein identified by spray drying a homogenized slurry composition comprising from 2 to 55% solids comprising the desired ingredients. Spray drying of the homogenized slurried composition in an acidic or basic condition may be accomplished in a conventional manner known in the art. However, more importantly, in accordance with one embodiment of this invention, the homogenized slurry mixture of desired ingredients is spray dried into the dilute or above a dense bed catalyst phase in a flue catalyst conversion or reduced crude conversion regeneration zone wherein relatively high combustion temperatures are encountered. The high temperature of this dilute catalyst phase can be relied upon to dry the sprayed microspherical catalyst particles for in situ preparation in the presence of regeneration combustion product flue gases which carry away formed steam from the major mass of catalyst particles therein undergoing regeneration. In this dispersed catalyst phase high temperature environment in the range of 1200° to 1400° F. the sprayed slurry forms microspherical particles and formed steam is removed before causing hydrothermal degradation of the mass of dense phase catalyst particles being regenerated. In this manner excess heat from regeneration can be economically utilized to further reduce the cost of catalyst preparation. It will be recognized by those skilled in the art that the homogenized slurry may be considerably thickened during homogenization thereof and sprayed into the dilute catalyst phase. The dispersed catalyst phase temperature will be reduced and generally below CO combustion temperatures therein should they exist. This new and novel combination technique of forming spray dried catalyst particles can be used to some considerable advantage, particularly when incorporating carbon black in the homogenized slurry mix to form a large pore distribution in the catalyst particle above identified. Since the spray dried particle formed in the dispersed phase will be heated to a high temperature and will fall into the dense fluid bed of catalyst there below being regenerated, the added carbon black will be removed by combustion. This particular in situ catalyst preparation or novel operating technique of this invention offers considerable flexibility and economy to the combination of catalyst preparations. That is, the slurry components comprising the catalyst composition may be varied at will, if not daily; the catalyst may be prepared in situ as needed and the heat available in the dispersed catalyst phase of the regenerator is available for drying the sprayed material which combination contributes measurably to the economics of the operation particularly associated with catalyst preparation. In this atmosphere of operating novelty it is further recognized that the refiner is now able to vary composition of the catalyst particles as the oil feed supplied and processed is varied and as new catalyst technology is uncovered such flexibility in operation benefits considerably with respect to reduced costs to manufacture catalyst, reduces capital investment and more particularly permits adjustment of catalyst composition and activity essentially at will to optimize conversion of a given oil charge. It is even visualized that microprocessor control can be utilized to vary catalyst composition daily. Other advantages to this operating technique will be recognized by those skilled in the art particularly when a given reduced crude conversion operation requires variation in catalyst replacement due to attrition and changes in catalyst replacement rates as metals accumulation increases to equilibrium status to achieve particularly desired results requiring changes in catalyst activity-selectivity characteristics. The benefits derived by using catalysts prepared using the colloidal and the preparation techniques of this invention are manifold:

(1) Reduced crudes contain high vanadium (V) levels which upon deposition on the RCC catalyst in the riser cracking operation followed by catalyst regeneration yields $V_2O_5$. $V_2O_5$ melts (1275° F.) below RCC regeneration temperatures, flows through the catalyst destroying catalytic sieve and thus destroys catalytic activity. The reaction of any sodium present with $V_2O_5$ yields sodium vanadate, also a low melting solid (1240° F.). This melting point of sodium vanadate is also below normal RCC regeneration temperatures (1250° to 1500° F.). Thus either of these metal composition species are capable of migration or flow as a liquid across and through catalyst particles causing irreversible destruction of the zeolite crystalline structure to form an amorphous material resulting in a substantial loss in catalyst activity and selectivity. In addition, the flow of vanadia causes matrix sintering, pore blockage and particle coalescence sufficient to cause defluidization in the operating environment in which employed.

To counteract the liquid migration effects of $V_2O_5$, immobilization agents such as Ti, Zr, and In are added to the catalyst particle composition during or after preparation thereof. A slurry mixture of the catalyst ingredients may be provided with one or more vanadia immobilization agents to form stable-high melting solids with deposited vanadia as it occurs while encountering high temperatures in the regenerator. The formed high melting solids would indicate vanadium titanate, vanadium zirconate, vanadium indiate titanate, vanadium zirconate, vanadium indiate or other suitable added complex forming materials all of which will not melt at regeneration temperatures. The presence of sodium in the hydrocarbon feed, however, will form high melting sodium derivatives of Ti, Zr, In, such as Na titanate, Na zirconate, Na indiate and thus reduce the effectiveness of Ti, Zr, and In as V immobilization agents.

(2) Sodium in the catalyst particle will also migrate and react with and tie up acid cracking sites present in the zeolite and matrix material and thus reduce the activity-selectivity characteristics of the catalyst. This necessarily also reduces the desired cracking activity of the catalyst matrix for the conversion of the large nonvolatile molecules present in reduced crude to provide smaller-volatile molecules that can enter the zeolite pore structure for further cracking to gaseous and liquid fuels such as gasoline and heating fuels. By having little or substantially no mobile sodium present in the catalyst as prepared by the concepts and sequence of steps of this invention and by operating an efficient desalter on the raw crude oil feed we ensure that the effectiveness of vanadia immobilization additives are maximized and sodium deactivation is minimized.

(3) By having little or no mobile sodium present in the matrix materials including the sol binding matrix material and the clay obtained by acid treating and exchanging sodium out of any clay material utilized or by using the particular kaolinite clay above identified, a large number of acid sites can be provided and maintained in the catalyst matrix. One can thus tolerate a somewhat higher sodium level in the feed, since the matrix can react with or immobilize sodium present in the feed, maintain matrix cracking activity for a longer on stream time period and ensure that very little, if any, sodium reaches the crystalline zeolite catalyst component and thus neutralize zeolite cracking activity.

(4) The calcination of a (REY) rare earth exchanged "Y" zeolite followed by (RE) rare earth exchange after calcination ensures high sodium removal and provides the low sodium content special crystalline zeolite composition particularly desired. Furthermore, a better temperature control of zeolite calcination is possible and a better rare earth exchange environment is provided to obtain a lanthanum rich rare earth exchanged zeolite. Secondly, the rare earths are more easily exchanged into the crystalline zeolite to replace sodium and/or hydroogen therein as opposed to (RE) exchanging a final catalyst particle composition or complex comprising a rare earth exchanged "Y" zeolite (REY) containing catalyst particle composition. The rare earth exchanging of spray dried REY containing catalyst particles puts some RE into the matrix without assuring maximum exchange with sodium in the zeolite component of the particle and this will neutralize some previously established acid sites in the matrix thus reducing the matrix cracking acidity, sodium neutralization level of the feed and lastly, this method of removing sodium from a catalyst particles requires substantially more rare earth solution to obtain (RE) rare earth at a desired level in the crystalline zeolite component so as to reduce its sodium and/or hydrogen level.

The novel catalyst preparation procedure of this invention is designed to considerably reduce the cost of catalysts, especially but not necessarily limited to processing carbo-metallic feedstocks. The procedure also considerably reduces the other above undesired impediments, derogatory results and particularly ensures obtaining a low cost, a low sodium, high activity if desired, matrix material in combination with the special crystalline zeolite composition which characteristics are considered particularly desirable and more appropriately utilized when coupled with the other desirable catalyst ingredient and preparational features particulrly identified above.

Having thus generally described the improved techniques of this invention and discussed specific examples in support thereof, it is to be understood that no undue restrictions are to be imposed by reasons thereof except as defined by the following claims.

When providing catalysts for carbo-metallic feedstock conversion, cost becomes an exceedingly important factor, as catalyst requirements for processing of high metals containing feedstocks are many times that required for processing of vacuum gas oil. The considerable advantages of this method of catalyst preparation will be obvious to one skilled in the art.

We claim:

1. A method for preparing a hydrocarbon conversion catalyst comprising a crystalline zeolite, a clay, and a colloid binder material, said catalyst being prepared from catalyst ingredients selected from the group consisting of binders, crystalline zeolites, sols, clays, pore formers, sacrificial crystalline zeolites, acidic matrix substances, and metal getters and being suitable for use in converting heavy oil feeds, which method comprises:
   (a) forming separate liquid slurries of two or more of said ingredients;
   (b) preparing each of said liquid slurries from low-sodium content material and low-sodium content water so that the total sodium content of a spray dried composite of said liquid slurries when used alone or in combination with one or more of said ingredients added to a slurry as a powder is less than about 0.25 wt % sodium oxide;
   (c) thoroughly mixing two or more of said liquid slurries alone or in combination with one or more of said ingredients added to a slurry as a powder to form a slurry mixture; and
   (d) spray drying said slurry mixture to provide fluidizable catalyst particles suitable for use in catalytic cracking of heavy oil feeds and having a low-sodium content of less than 0.25 wt % sodium oxide.

2. The method of claim 1, wherein said method for preparing a spray dried catalyst is conducted near the point of use of said catalyst in a hydrocarbon conversion process.

3. The method of claim 1, wherein said catalyst is formed by injecting said slurry mixture into the dilute catalyst phase of a catalyst regenerator of a hydrocarbon conversion unit.

4. The method of claim 1, wherein the catalyst particles are formed by injecting said slurry mixture into the dilute catalyst phase of a catalyst regeneration of a reduced crude conversion process in which carbo-metallic hydrocarbons are cracked into lower molecular weight products in the presence of at least about 5 ppm by weight of vanadia in the hydrocarbon feedstock and are used in said reduced crude conversion process.

5. The method of claim 1, wherein an alumina sol is used to form said catalyst particles.

6. The method of claim 1, wherein an alumina coated silica sol is used to form said catalyst particles.

7. The method of claim 1, wherein a combination of silica and alumina sols is employed to form said catalyst particles.

8. The method of claim 1, wherein a colloidal titania sol is a part of said slurry mixture.

9. The method of claim 1, wherein a colloidal zirconia sol is a part of said slurry mixture.

10. The method of claim 1, wherein an alumina colloid sol is contacted with one or more of $TiO_2$, $ZrO_2$, $Cr_2O_3$, $Fe_2O_3$, and $Al_2O_3$ to form a coating on the alumina colloid particles of said alumina colloid sol before admixture of said alumina colloid sol with a slurry comprising a mixture of crystalline zeolite particles and clay particles.

11. The method of claim 1, wherein a sol comprising a mixture of silica and alumina colloid particles is contacted with one or more of $TiO_2$, $ZrO_2$, $Cr_2O_3$, $Fe_2O_3$, and $Al_2O_3$ to form a coating on the colloid particles before admixture of said sol with a slurry comprising a mixture of crystalline zeolite particles and clay particles.

12. The method of claim 1, wherein an alpha alumina monohydrate is added to an aqueous slurry of colloidal silica.

13. The method of claim 1, wherein an aqueous slurry comprising a silica sol is adjusted to a basic pH before adding a powder of crystalline zeolite thereto which has been rare earth exchanged before and after calcination to provide a high ratio of La/Ce.

14. The method of claim 1, wherein a sacrificial crystalline zeolite of an acceptable sodium content is used and is selected from the group consisting of zeolite A, mordenite, chabazite, a cheap faujasite, and a pillared clay material.

15. the method of claim 1, wherein the acidity of the formed catalyst particles is increased during catalyst preparation by the addition of one or more materials which are volatile at elevated temperatures and are selected from the group consisting of phosphates, a halogen contributing material, phosphoric acid, sulfuric acid, and boric acid.

16. The method of claim 1, wherein the acidity of the catalyst particles is increased by the addition of one or more materials selected from silica-alumina, silica-titania, silica-zirconia, acid activated clay, mordenite, chabazite, and erionite.

17. The method of claim 1, wherein a desired pore size distribution of the spray dried microspherical particles is provided by the addition of carbon black to one of said liquid slurries or said slurry mixture before spray drying of said slurry mixture.

18. A catalyst prepared by the method of claim 1, said catalyst being suitable for the catalytic conversion of a heavy oil feed that is selected from the group consisting of residual oils, topped crudes, reduced crudes, heavy oils comprising components boiling above 1050° F., shale oils, oil products of coal liquefaction, tar sands oil products, and combinations thereof.

19. The method of claim 1, wherein an additive material to increase pore volume is added before spray drying said slurry mixture into the dilute catalyst phase of a fluid catalyst regenerator and said additive material is removed from the formed catalyst particle composition during high temperature contact with oxygen containing gas in the catalyst regeneration step.

20. A method for preparing a fluidizable microspherical cracking catalyst composition suitable for use in converting a heavy oil feed comprising carbo-metallic impurities, which method comprises:
   (a) preparing a colloidal silica slurry of basic or acidic pH level which will avoid gel formation;
   (b) preparing an aqueous slurry of micro size clay particles adjusted to a pH above or below the range of 5.5 to 7;
   (c) preparing an aqueous slurry of micro particles of a calcined rare earth exchanged crystalline "Y" zeolite which is exchanged further with rare earth metals to provide a lanthanum to cerium ratio of at least 2:1 and a sodium content below 0.3 wt %;

(d) mixing said colloidal silica slurry and said slurry of micro size clay particles to form a first slurry mixture, adding said slurry of crystalline zeolite to said first slurry mixture with homogenous mixing to obtain a second slurry mixture;

(e) spray drying said second slurry mixture to form microspherical catalyst particles comprising silica, from 5 to about 60 wt % of said crystalline zeolite, up to about 35 wt % of said clay; and (f) recovering said microspherical catalyst particles for use in converting said heavy oil feed into transportation fuels.

21. The method of claim 20, wherein the recovered microspherical particles are further exchanged with rare earth metals to increase the lanthanum to cerium ratio of said microspherical particles.

22. The method of claim 20, wherein the colloidal silica slurry is mixed with one of alumina, magnesia, zirconia, titania, or a combination thereof to form a colloidal mixture and said colloidal mixture is maintained above or below a pH in the range of 5.5 to 7 during preparation of said second slurry mixture.

23. The method of claim 20, wherein the spray dried catalyst comprises a pore volume of at least 0.35 cc/g and carbon black is added to one of said slurries of said second slurry mixture before spray drying said second slurry mixture to provide substantial pore size openings of at least 500 Angstroms up to 40% and at least 25% greater than 1000 Angstroms upon calcination of the recovered spray dried mircospherical particles.

24. The method of claim 20, wherein said crystalline zeolite is a zeolite having a silica to alumina ratio of at least 4.5:1.

25. The method of claim 20, wherein said clay is a member selected from the group consisting of kaolin, kaolinite, metakaolin, ball clays, montoorillonite, bentonite, halloysite, acid leached clays, and combinations thereof.

26. The method of claim 21, wherein said rare earth exchanged recovered microspherical particles are calcined sufficiently to reduce the sodium content thereof below 0.1 wt % and provide rare earths in the silica clay matrix component of the catalyst.

27. The method of claim 20, wherein said slurries are formed with particles having different particle sizes to vary the porosity and attrition resistance of said recovered microspherical particles.

28. The method of claim 20, wherein said first slurry mixtures is provided with a material selected from the group consisting of TiO2, ZrO2, Al2O3, and Sb2O3 as a part of the catalyst matrix.

29. The method of claim 20, wherein the particles of said colloidal silica are coated with a member of the group consisting of $TiO_2$, $ZrO_2$, $Re_2O_3$, $Cr_2O_3$, $Fe_2O_3$, and $Al_2O_3$.

30. A method for preparing a catalyst comprising a calcined rare earth exchanged "Y" crystalline zeolite provided with a lanthanum to cerium ratio of at least 1, which method comprises:

(a) which method comprises: of micro-size kaolinite clay particles;

(b) preparing a liquid slurry comprising a lanthanum-rich "Y" crystalline zeolite of less than 0.47 wt % residual sodium obtained by one or more treatments, each comprising the sequence of exchange with rare earth metals and calcination;

(c) mixing said slurry of clay particles with a slurry of colloidal silica to form a first slurry mixture comprising less than about 0.05 wt % Na20;

(d) mixing said slurry of crystalline zeolite with said first slurry mixture homogenized second slurry mixture at a pH avoiding gelling thereof;

(e) spray drying said second slurry mixture after homogenization to form microspherical cataylst particles comprising about 10 to 50 wt % silica, about 5 to 50 wt % clay, and about 15 to 85 wt % of said lanthanum-rich "Y" crystalline zeolite; and (f) recovering said microspherical particles.

31. The method of claim 30, wherein said second slurry mixture comprises 2 to 55% solids.

32. The method of claim 30, wherein the homogenizing temperature of step (d) is restricted to within the range of 90° F. to 150° F.

33. The method of claim 30, wherein the lanthanum-rich "Y" crystalline zeolite of said microspherical catalyst particles comprises at least 6 wt % rare earths.

34. The method of cliam 30, wherein said lanthanum-rich "Y" crystalline zeolite is mixed with one or more crystalline zeolites selected from the group consisting of zeolite A, ZSM-4, zeolite L, gmelinite, mordenite, and a cheap low-quality faujasite of low sodium content.

35. A method for preparing a catalyst composition suitable for converting hydrocarbon feeds, which method comprises:

(a) preparing a liquid slurry of micro-size clay particles;

(b) preparing aliquid slurry of a crystalline zeolite selected from the group consisting of CREY, RECREY, ultra-stable "Y", HY, ZSM-5, high silica zeolites, and mixtures thereof;

(c) mixing said liquid slurry of micro-size clay particles with a colloidal silica to form a low sodium clay-silica slurry mixture;

(d) mixing said slurry of a crystalline zeolite with said clay-silica slurry mixture under conditions to form a smooth slurry mixture at a pH avoiding gelling thereof;

(e) spray drying said smotth slurry mixture under conditions to form microspherical catalyst particles comprising 10 to 50 wt % silica, 5 to 50 wt % clay, and 10 to 50 wt % of said crystalline zeolite; and (f) recovering said microspherical catalyst particles.

36. The method of claim 35, wherein said crystalline zeolite is ultra-stable "Y" zeolite.

37. The method of claim 35, wherein said crystalline zeolite is HY zeolite.

38. The method of claim: 35, wherein said microspherical catalyst particles are exchanged with rare earth metals to provide lanthanum-rich catalyst particles.

39. The method of claim 35, wherein said microspherical catalyst particels comprises an ultra-stable "Y" crystalline zeolite in admixture with a crystalline zeolite selected from the group consisting of zeolite A, ZSM-4, zeolite L, gmelinite, mordenite, chabazite, erionite, and a low sodium faujasite zeolite.

40. The method of claim 35, wherein an alumina sol contacted with one or more of $TiO_2$, $ZrO_2$, $Cr_2O_3$, $Fe_2O_3$, and $Al_2O_3$ is formed for admixture with said smooth slurry mixture.

41. The method of claim 40, wherein said microspherical catalyst particles comprise one or more of silica-alumina, silica-titania, and silica-zirconia.

42. The method of claim 35, wherein the pore size distribution of said microspherical catalyst particles is increased by adding carbon black to said smooth slurry mixture before spray drying.

43. The method of claim 35, wherein said smooth slurry mixture is sprayed into the dilute catalyst phase of a catalyst regeneration operation to form calcined microspherical catalyst particles.

44. The method of claim 43, wherein the micro-size clay particles employed in said method are selected from the group consisting of kaolin, kaolinite, ball clays, montmorillonite, bentonite, halloysite, acid leached clays, and combinations thereof.

* * * * *